US009613498B2

(12) United States Patent
Koustas et al.

(10) Patent No.: US 9,613,498 B2
(45) Date of Patent: Apr. 4, 2017

(54) SYSTEMS AND METHODS FOR PEER-TO-PEER GAMING

(75) Inventors: Nicholas Koustas, Cherry Hills, CO (US); John Mix, Denver, CO (US); Alexander Oxman, Denver, CO (US)

(73) Assignee: AG 18, LLC, Denver, CO (US)

( * ) Notice: Subject to any disclaimer, the term of this patent is extended or adjusted under 35 U.S.C. 154(b) by 277 days.

(21) Appl. No.: 12/488,241

(22) Filed: Jun. 19, 2009

(65) Prior Publication Data

US 2009/0318219 A1 Dec. 24, 2009

Related U.S. Application Data

(60) Provisional application No. 61/074,572, filed on Jun. 20, 2008.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .......... *G07F 17/3295* (2013.01); *G07F 17/32* (2013.01); *G07F 17/3223* (2013.01); *G07F 17/3262* (2013.01); *G07F 17/3286* (2013.01)

(58) Field of Classification Search

USPC .......................................................... 463/42

See application file for complete search history.

(56) References Cited

U.S. PATENT DOCUMENTS

| | | | | |
|---|---|---|---|---|
| 4,760,527 | A | 7/1988 | Sidley et al. | |
| 4,926,327 | A | 5/1990 | Sidley | |
| 5,472,194 | A * | 12/1995 | Breeding et al. | 463/27 |
| 5,755,621 | A | 5/1998 | Marks et al. | |
| 5,762,552 | A | 6/1998 | Vuong et al. | |
| 5,800,268 | A | 9/1998 | Molnick | |
| 5,882,260 | A | 3/1999 | Marks et al. | |
| 6,093,100 | A | 7/2000 | Singer et al. | |
| 6,264,561 | B1 * | 7/2001 | Saffari et al. | 463/42 |
| 6,508,709 | B1 | 1/2003 | Karmarkar et al. | |
| 6,676,522 | B2 | 1/2004 | Rowe et al. | |
| 6,679,777 | B2 | 1/2004 | Pfeiffer et al. | |
| 7,100,916 | B2 | 9/2006 | Kelly et al. | |

(Continued)

FOREIGN PATENT DOCUMENTS

WO WO 03/093921 A2 11/2003

*Primary Examiner* — Kevin Y Kim
(74) *Attorney, Agent, or Firm* — Setter Roche LLP

(57) ABSTRACT

A system and method for peer-to-peer gaming is described. One embodiment includes a system for peer-to-peer gaming, the system comprising an at least one gaming client, wherein the at least one gaming client is configured to accept a selection of an at least one gaming option from a player, and allow the player to play a game based on the selection of the at least one gaming option; an administration server, wherein the administration server is configured to receive the selection of the at least one gaming option from the at least one gaming client, and initiate the game for the player based on the selection of the at least one gaming option; and an at least one gaming server, wherein the at least one gaming sever is configured to run the game and transmit data about the game to the administration server.

20 Claims, 12 Drawing Sheets

(56) References Cited

U.S. PATENT DOCUMENTS

| | | | |
|---|---|---|---|
| 7,306,516 | B2 | 12/2007 | Iosilevsky et al. |
| 7,361,091 | B2 | 4/2008 | Letovsky et al. |
| 7,367,563 | B2 | 5/2008 | Yoseloff et al. |
| 7,699,702 | B2 | 4/2010 | Daniel et al. |
| 7,867,091 | B2 | 1/2011 | Moshal et al. |
| 7,914,381 | B2 | 3/2011 | Blythe et al. |
| D646,336 | S | 10/2011 | Kelly et al. |
| D646,337 | S | 10/2011 | Kelly et al. |
| 8,052,526 | B2 | 11/2011 | Abbott et al. |
| 8,235,791 | B2 | 8/2012 | Kelly et al. |
| 8,235,792 | B2 | 8/2012 | Kelly et al. |
| 8,241,106 | B2 | 8/2012 | Kelly et al. |
| 8,298,067 | B2 | 10/2012 | Kelly et al. |
| 8,392,506 | B2 | 3/2013 | Giobbi et al. |
| 8,529,349 | B2 | 9/2013 | Kelly et al. |
| 8,535,158 | B2 | 9/2013 | Kelly et al. |
| 8,613,656 | B2 | 12/2013 | Wudtke et al. |
| 8,616,958 | B2 | 12/2013 | Hermansen et al. |
| 8,657,666 | B2 | 2/2014 | Wudtke et al. |
| 8,657,676 | B2 | 2/2014 | Kelly et al. |
| 8,678,914 | B2 | 3/2014 | Young et al. |
| 8,715,053 | B2 | 5/2014 | Kelly et al. |
| 8,721,427 | B2 | 5/2014 | Kelly et al. |
| 8,734,238 | B2 | 5/2014 | Arnone et al. |
| 8,764,566 | B2 | 7/2014 | Fissell et al. |
| 8,777,720 | B2 | 7/2014 | Kelly et al. |
| 8,821,270 | B2 | 9/2014 | Meyerhofer et al. |
| 8,821,296 | B1 | 9/2014 | Knock et al. |
| 8,827,803 | B2 | 9/2014 | Kelly et al. |
| 8,856,657 | B2 | 10/2014 | Arbogast et al. |
| 8,888,578 | B2 | 11/2014 | Tallcott et al. |
| 8,926,422 | B2 | 1/2015 | Loose et al. |
| 8,944,916 | B2 | 2/2015 | Gura et al. |
| 8,992,307 | B2 | 3/2015 | Young |
| 8,992,323 | B2 | 3/2015 | Martin et al. |
| 9,092,944 | B2 | 7/2015 | Kisenwether et al. |
| 9,269,221 | B2 | 2/2016 | Gobbi et al. |
| 9,275,514 | B2 | 3/2016 | Brahmandam et al. |
| 9,336,962 | B2 | 5/2016 | Wudtke et al. |
| 2001/0004609 | A1 | 6/2001 | Walker et al. |
| 2001/0019965 | A1* | 9/2001 | Ochi ..... 463/25 |
| 2002/0002075 | A1* | 1/2002 | Rowe ..... 463/25 |
| 2002/0028707 | A1 | 3/2002 | Pascal et al. |
| 2002/0103028 | A1 | 8/2002 | Carter et al. |
| 2002/0103029 | A1 | 8/2002 | Finlayson et al. |
| 2002/0123377 | A1 | 9/2002 | Shulman et al. |
| 2002/0169015 | A1 | 11/2002 | Moody et al. |
| 2003/0130041 | A1 | 7/2003 | Pascal et al. |
| 2005/0026696 | A1* | 2/2005 | Hashimoto et al. ..... 463/42 |
| 2005/0043094 | A1 | 2/2005 | Nguyen et al. |
| 2005/0090304 | A1 | 4/2005 | Crawford et al. |
| 2005/0215326 | A1 | 9/2005 | Iosilevsky et al. |
| 2006/0025221 | A1 | 2/2006 | Jain et al. |
| 2006/0058088 | A1 | 3/2006 | Crawford et al. |
| 2006/0189381 | A1 | 8/2006 | Daniel et al. |
| 2006/0258425 | A1 | 11/2006 | Edidin et al. |
| 2006/0287103 | A1 | 12/2006 | Crawford et al. |
| 2007/0015584 | A1 | 1/2007 | Frenkel et al. |
| 2007/0087834 | A1* | 4/2007 | Moser et al. ..... 463/42 |
| 2007/0202941 | A1* | 8/2007 | Miltenberger ..... G07F 17/32 463/25 |
| 2007/0259709 | A1 | 11/2007 | Kelly et al. |
| 2008/0004107 | A1 | 1/2008 | Nguyen et al. |
| 2008/0248849 | A1* | 10/2008 | Lutnick ..... G07F 17/32 463/16 |
| 2009/0124376 | A1 | 5/2009 | Kelly et al. |
| 2009/0186701 | A1 | 7/2009 | Rowe et al. |
| 2009/0227362 | A1 | 9/2009 | Kelly et al. |
| 2009/0239667 | A1 | 9/2009 | Rowe et al. |
| 2009/0270175 | A1 | 10/2009 | Kelly et al. |
| 2009/0276341 | A1 | 11/2009 | McMahan et al. |
| 2009/0276715 | A1 | 11/2009 | Arbogast et al. |
| 2009/0318219 | A1 | 12/2009 | Koustas et al. |
| 2009/0325695 | A1 | 12/2009 | Wudtke et al. |
| 2009/0325715 | A1 | 12/2009 | Kelly et al. |
| 2010/0035694 | A1 | 2/2010 | Losica et al. |
| 2010/0113140 | A1 | 5/2010 | Kelly et al. |
| 2012/0135801 | A1 | 5/2012 | Finnimore et al. |
| 2012/0143906 | A1 | 6/2012 | Sibbold et al. |
| 2012/0276983 | A1 | 11/2012 | Young et al. |
| 2012/0322544 | A1 | 12/2012 | Rowe et al. |
| 2013/0005428 | A1 | 1/2013 | Kelly et al. |
| 2013/0035152 | A1 | 2/2013 | Kelly et al. |
| 2013/0080238 | A1 | 3/2013 | Kelly et al. |
| 2013/0143640 | A1 | 6/2013 | Young et al. |
| 2013/0231180 | A1 | 9/2013 | Kelly et al. |
| 2013/0331184 | A1 | 12/2013 | Kelly et al. |
| 2014/0094256 | A1 | 4/2014 | Hilbert et al. |
| 2014/0094272 | A1 | 4/2014 | Kelly et al. |
| 2014/0094279 | A1 | 4/2014 | Lockard et al. |
| 2014/0194199 | A1 | 7/2014 | DiGiovanni et al. |
| 2014/0243076 | A1 | 8/2014 | Arnone et al. |
| 2014/0287826 | A1 | 9/2014 | Zhao et al. |
| 2015/0194012 | A1 | 7/2015 | Hendrickson et al. |
| 2015/0294535 | A1 | 10/2015 | Hightower et al. |
| 2016/0133123 | A1 | 5/2016 | Giobbi et al. |

* cited by examiner

SYSTEMS AND METHODS FOR PEER-TO-PEER GAMING

PRIORITY

The present application claims priority from to commonly owned and assigned application No. 61/074,572, filed Jun. 20, 2008, entitled SYSTEMS AND METHODS FOR PEER-TO-PEER GAMING, which is incorporated herein by reference.

FIELD OF THE INVENTION

The present invention relates to systems and methods for peer-to-peer gaming. In particular, but not by way of limitation, the present invention relates to systems and methods for skill-based peer-to-peer gaming.

BACKGROUND OF THE INVENTION

Skill-based games are, for example, games that allow users to compete for money or points either in a one-on-one manner or in a multiplayer tournament environment. These games differ from traditional gambling in that the games are based primarily on skill and are less influenced by chance.

Most skill-based games fall into four general categories:

- Arcade/Video Games—Arcade games are games that involve quick fingers and quick thinking. These games are basically sped-up puzzle games. Arcade skill-based games include games based on football, basketball, car racing or other sports.
- Puzzle Games—Puzzle games are games that rely on logic abilities and require the user to solve certain types of puzzles. While not as fast-paced as arcade games, these games often come with a time limit. Popular puzzle games include games that require modification of objects and their locations to create a particular result.
- Word Games—Word games are games that are basically puzzle games using word problems, like rearranging letters to make words.
- Trivia Games:—Trivia games are games that test the user's knowledge of trivia in specific categories or in general.

Some skill-based games heavily modify the game play of "regular" casual games such as solitaire or in order to remove as many random events as possible. The analogy is that the influence of chance in a skill-based game should not exceed the influence of chance in any other pro sport competition, such as golf or football. For example, in a skill-based Solitaire competition, the players could be given the same cards in the same order so that the final score can be fairly compared.

Skill-based games have been, and continue to be, offered on internet websites where users are allowed to compete for points and/or money. Like poker sites, skill-based game sites take a rake from peer-to-peer and tournament games, but unlike casino games or games of chance, the outcome of a skill game is predominantly determined by the user's skill level. Moreover, unlike traditional games such as poker, skill-based gaming is not offered in casinos or other closed system markets.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed herein.

The present invention can provide a system and method for peer-to-peer gaming. In one exemplary embodiment, the present invention can include a method for peer-to-peer gaming. For one method, a plurality of game options are provided to a first player through a peer-to-peer gaming system. The first player then makes a game selection from the plurality of game options which is received by the system. In some embodiments, the game options could include skill-based game options. In addition, the method could include providing to the first player a plurality of competitor player options, wherein the plurality of competitor player options includes at least a second player. The first player and the second player could also be provided with an interface to select a wager amount. The wager amount selection, and a corresponding wager, could be received from the first player and the second player. The first and second player could further be provided the game selection for game play. A game result could also be determined based on the first player's and second player's game play. This game result could also be received by the peer-to-peer gaming system. Based on the game result, the method could include providing a credit to a winner determined by the game result. In some embodiments, the wager amount is a monetary wager amount and the credit to the winner would be a monetary credit.

In another exemplary embodiment, the present invention can include a system for peer-to-peer gaming. In one example, the exemplary system could include a plurality of user interfaces, including at least a first user interface and a second user interface. These user interfaces could be connected to a peer-to-peer platform. In addition, the peer-to-peer platform could be connected to a game server, where the game server includes a plurality of game options. For one embodiment the peer-to-peer platform could be configured to assist a first user at the first user interface in locating a second user at the second user interface. In addition, the peer-to-peer platform could be configured to assist the first user and second user agree upon a wager amount, and compete in one of the plurality of game options. In some embodiments, the first user and the second user compete in one of the plurality of game options for a prize amount wherein the prize amount comprises the wager amounts less a house take.

As previously stated, the above-described embodiments and implementations are for illustration purposes only. Numerous other embodiments, implementations, and details of the invention are easily recognized by those of skill in the art from the following descriptions

BRIEF DESCRIPTION OF THE DRAWINGS

Various objects and advantages and a more complete understanding of the present invention are apparent and more readily appreciated by reference to the following Detailed Description when taken in conjunction with the accompanying Drawings wherein.

DETAILED DESCRIPTION

Figure 1:
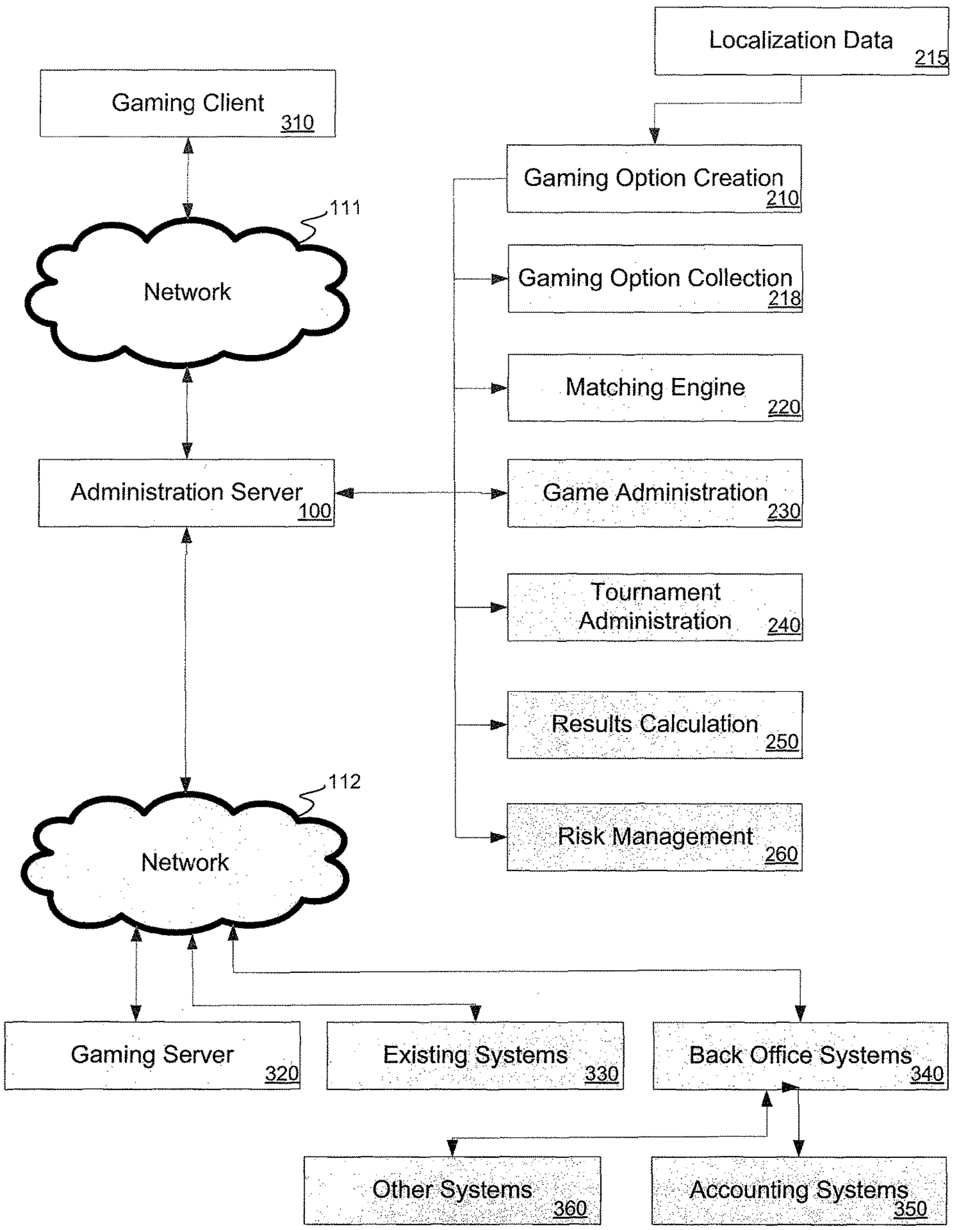
FIG. 1 illustrates a high level network architecture of an exemplary embodiment of a system for peer-to-peer gaming.

Referring now to the drawings and in particular to the network layout in FIG. 1, it illustrates an exemplary embodiment of a high level network architecture of an embodiment of the present invention. The arrangement is logical and not meant to be an actual hardware design. Thus, the components can be combined or further separated in an actual implementation. As shown in FIG. 1, in one embodiment a Gaming Client 310 and Administration Server 100 are connected over a Network 111. The Gaming Client 310 represents the hardware and included software that is used by individual users, or players, who want to participate in peer-to-peer gaming including peer-to-peer skill-based gaming. For example, a player could be provided, or use, various embodiments of the present invention, including Touch Screen Kiosks, Palmtops, PDAs, Wireless Tablets, or Slot/Video Machines. In one embodiment, the Gaming Client 310 is a custom built end-user interface that utilizes currently deployed equipment on the casino floor such as Wireless Handheld devices, Kiosks and Interactive TVs. The interface of the Gaming Client 310 is customizable for visual consistency with an existing framework. For example, the interface could be adapted to run on an existing slot machine. In one embodiment of the present invention, the invention would allow for slot machine games to run on the client during certain periods of time, while allowing peer-to-peer gaming on the client at other periods of time. In yet another embodiment, the client could offer peer-to-peer gaming options, different slot machine type options and various other games for consumer choice. In this way, casinos, hotels and similar establishments would be able to provide a high level of flexibility in gaming options, while simplifying the hardware and software infrastructure. Other options, variations and modifications are possible.

In FIG. 1, the Gaming Client 310 is shown connected to the Administration Server 100 via a Network 111. In one embodiment the Network 111 could be a Local Area Network (LAN) limited to a single casino, hotel, or other establishment. In another embodiment, the Network 111 could comprise a Wide Area Network (WAN) linking numerous casinos within a gaming jurisdiction (e.g., the state of Nevada or an Indian Reservation). In yet another example, a LAN could be used to connect various casinos spaced relatively close together, such as in Las Vegas. The Gaming Client 310 and the Administration Server 100 are connected to the Network 111 through communications interfaces. This interface could be a network interface that is suited for the Network 111. The features and functions of this network will depend on where and how the system is implemented. Those skilled in the art will realize various modifications and variations consistent with the present invention.

In one exemplary embodiment, the Administration Server 100 could be located in the same location as the Gaming Client 310. In another embodiment, the Administration Server 100 could be located in a remote location. In yet another embodiment, the Administration Server 100 could be located in a central location with the Gaming Client 310 at anther location. The type of connection between the server and client, whether wireless or wired, on an Ethernet, etc., will vary depending on the implementation of the system. Those skilled in the art will be aware of many modifications and variations allowed by the present invention.

In FIG. 1, the Administration Server 100 is also shown connected to Existing Systems 330, Back Office Systems 340, and Gaming Server 320 via Network 112. The Existing Systems 330 may include current casino gaming systems or payout systems. The Back Office Systems 340 may include Accounting Systems 350 or Other Systems 360. The Gaming Server 320 contains the games that are run by the Gaming Client 310. Note that the Gaming Server 320 could be one server or a set of servers. Any of the Existing Systems 330, Back Office Systems 340, or Gaming Server 320 could be housed in one machine or across a number of machines. Those skilled in the art will be aware of many modification and variations allowed by the present invention.

There are many ways that the player could play a game on the Gaming Client 310. In one exemplary embodiment, a game would be deployed on a client using an HTTP/web server and a web browser client. The HTTP/web server could communicate with the Administration Server 100 and the server would serve/distribute the interface to each client using any available browser/Client Side technologies like but not limited to: HTML, JavaScript, DHTML, AJAX, Flash, Shockwave, Java, Active X, Silverlight, or VBscript. In another exemplary embodiment, a customized Client/Server model could be used, where the Administration Server 100 communicates to a server based application (an EXE and/or DLL, etc. . . . ), which would then communicate to a customized user-interface application (an EXE, etc. . . . ). In yet another example, a Server Side application could be produced that would contain both the Server Side functionality and the Client Side functionality, but then also provide Client Side interaction by emulating/replicating the Client Side interface out on to the Gaming Client 310. The Gaming Client 310 will not actually produce the interface.

Rather, the client would present a series of images/interfaces that were transferred from the Administration Server 100. This method's process is similar to a traditional terminal/emulator client-server application. In all of these cases, the player always receives an unique and customized interface. The multitude of game distribution methods are required to be able to serve the varying types of games and their methods of game play and interaction. In one embodiment, the Gaming Client 310 will include a universal controller (not shown) that allows the player to play various types of games using the same controller. In another embodiment, each type of Gaming Client 310 will have its own type of game controller options available. The Gaming Client 310 could further be identified by the user of the Gaming Client 310. For example, the Administration Server 100 may know the Gaming Client 310 as a Player Gaming Client or as a Competitor Gaming Client. This list is not exhaustive and those skilled in the art will be aware of many modifications and variations allowed by the present invention.

The Administration Server 100 is an open and flexible gaming platform that can be used for real money wagering in legal gaming jurisdictions like Nevada and Indian reservations. Similar to the Windows operating system, which can act as a base platform and accept and run many different types of applications, an open and flexible gaming platform can act as a base platform for skill-based, and chance-based, games created by various game developers (e.g., card game developers, skill-based game developers, chance-based game developers, etc.). The server can also be dynamically adjusted for localization requirements such as language, currency and legal issues.

In FIG. 1, a preferred embodiment of the present invention, the Administration Server 100 includes a number of modules, such as: Gaming Option Creation 210, Gaming Option Collection 218, Matching Engine 220, Game Administration 230, Tournament Administration 240, Results Calculation 250, and Risk Management 260. The Gaming Option Creation module 210 takes information from the Localization Data module 215 to determine which games are available on the Administration Server 100. The Gaming Option Collection module 218 collects a selection of gaming options. The Matching Engine module 220 matches players on the system. The Game Administration module 230 oversees game play. The Tournament Administration module 240 keeps track of multiple games in a tournament. The Results Calculation module 250 calculates results from games and how to distribute winnings. The Risk Management module 260 allows the system to adjust game play based on specific risk factors. The server could consist of a single server or multiple servers. In the preferred embodiment, the Gaming Client 310 will communicate with the Administration Server 100 and Gaming Server 320 throughout the entire game play. Those skilled in the art will realize that many physical variations could be made to the number of devices used to created the Administration Server 100.

After the game, paying winnings to the player can be done in a number of ways. Referring again to FIG. 1, a player could receive currency at an embodiment of the Gaming Client 310. Additionally, a player could receive a "Ticket-Out" that can be turned in for cash or tokens that can be exchanged for cash or for play at another client. In one embodiment, such as a car racing game, a player could have selected a betting option such as $1/second-won-by. In this embodiment, there could be a constant interaction between the Gaming Server 320 and the Accounting Systems 350 to record live payout information. For example, if a player is 5 seconds ahead, he or she could have a monitor showing a $5 lead. As the lead changes, the monitor reflecting the monetary bet could also change. In this embodiment, the game could stop if a player's lead reaches a certain predetermined value, or if the Accounting Systems 350 determine that the player's account only has sufficient funds to cover the current total. Many variations and modifications to completion and payout will be required by various betting types and gaming options. Those skilled in the art will be aware of modifications the present invention to account for these situations.

For purposes of discussion, the present invention primarily uses examples of systems and methods for skill-based gaming and skill-based games. This is in no way intended as a limitation of the present invention to only skill-based games. In the preferred embodiment, the system can support skill-based games as well as traditional card games or other chance-based games. Even though Poker, in the strictest sense, is not a skill-based game, there are many advantages for setting up the system to be able to run Poker in addition to skill-based games. For example, given that Poker and other card games are well known and accepted in legal gaming jurisdictions, it is beneficial (although not required) for the system to be capable of serving as a platform for Poker style games. Moreover, by presenting a similar setup and feel to the skill-based platform for skill-based and Poker style games, the system seems more familiar to players, making it easier to transition to skill-based gaming.

Figure 2:
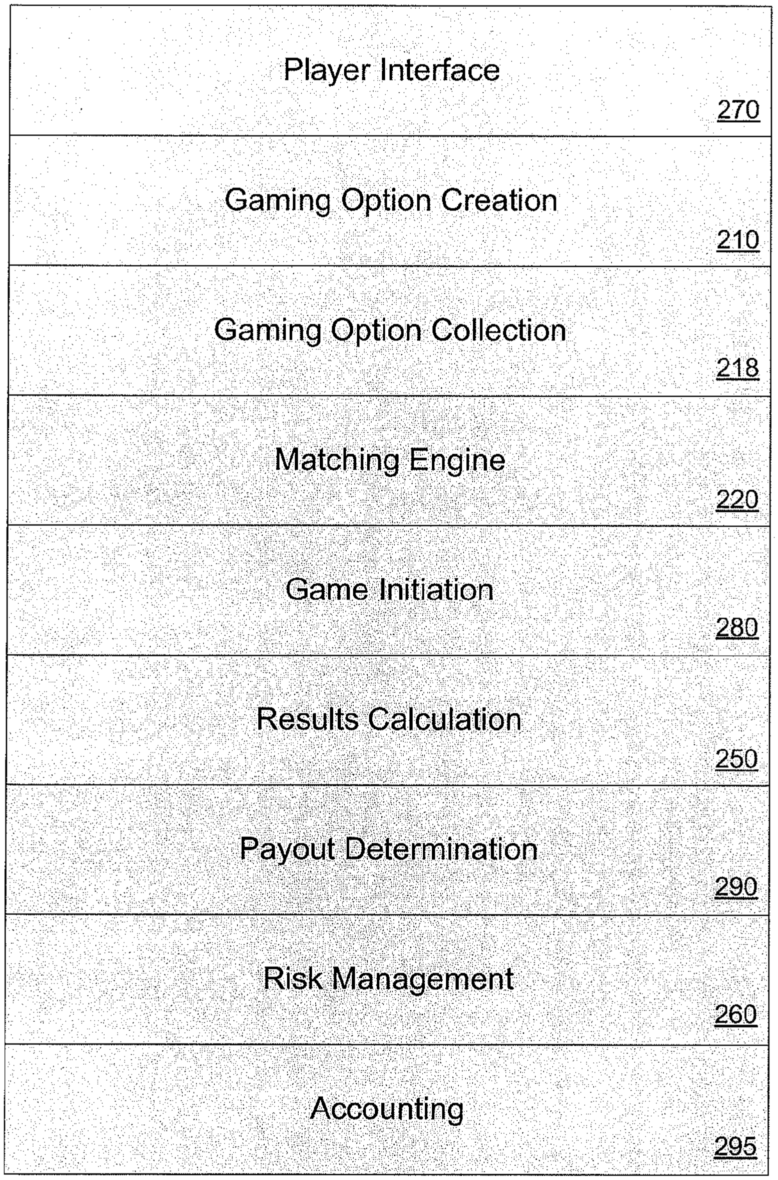
FIG. 2 illustrates an exemplary representation of software modules that could be used by and with a peer-to-peer platform consistent with the present invention.

Referring now to FIG. 2, it illustrates exemplary software modules of the present invention. These modules are described according to their function and could be grouped differently. As those skilled in the art understand, many of these functions could be combined together into one software module and similarly, many of these functions could be divided into several different software modules. The functional modules are discussed briefly with regard to FIG. 2 and in more detail with regard to the subsequent flow charts.

Referring first to the Player Interface module 270, it is an input-output controller and serves as the interface for the player to interact with the other modules. The module also directs communication from other modules to the client. For example, the module could present, among other things, game options to the player and the game itself.

The second software module shown in FIG. 2 is the Gaming Option Creation module 210. This module is designed to create a list of the available game options. This module uses information about the location of the user, such as legal jurisdiction and casino location, to determine which game options are presented to the player. The Player Interface module 270 could access the Gaming Option Creation module 210 to present the player with a list of gaming options. For example, that list may include which games are available, such as Poker or 9-Ball. The list may also include the wager amounts available for each game. This is not meant to be an exclusive list. A person having skill in the art will understand what other options would be appropriate.

The third software module shown in FIG. 2 is the Gaming Option Collection module 218. This module is designed to collect a selection from the list of gaming options presented to the player. For example, the Gaming Option Collection module 218 could access the Player Interface module 270 to receive which gaming options the player selected. This is just one embodiment of the present invention. Those skilled in the art will understand modifications and variations of the module consistent with the present invention.

The fourth software module shown in FIG. 2 is the Matching Engine module 220. This module is designed to match players who wish to play a game together. It uses information obtained through the Player Interface module 270 to find players that are compatible. Matching is discussed later with respect to the subsequent flow charts.

The fifth software module shown in FIG. 2 is the Game Initiation module 280. The game software may be located outside of the embodiment shown in FIG. 2. If the game software is located outside the system, the Game Initiation module 280 communicates information, including player information and player selected options, to the game software. The module also connects the Player Interface module 270 with the game software. In the alternative, if the game software is located inside the system, the Game Initiation module 280 starts a game. After a game has finished, or during game play, the module reports information about the game to the system. This information can be used later in calculating winnings and results.

The sixth software module shown in FIG. 2 is the Results Calculation module 250. At the end of a game, the system must determine which objectives each player achieved. This module uses information received from the Game Initiation module 280 in order to determine the game result. In some games, the result is simple, such as each hand of black jack. In other games, such as Football, the result may be more complicated. In some embodiments, the Results Calculation module 250 will receive the final result. In other embodiments, the Results Calculations module 250 will have to calculate the winner based on received game information.

The seventh software module shown in FIG. 2 is the Payout Determination module 290. After the end of a game, each player may have some winnings. The operator of the game usually deducts an administrative fee before paying out winnings. This module takes information from the Results Calculation module 250 to determine each player's appropriate winnings. Winnings could be in many forms, including, but not limited to: points, credits, or hard currency. After determining the amount of winnings due to the player, the Payout Determination module 290 initiates a payout to the player. Depending on the type of winnings, the module may communicate to different systems. For example, if the player is to receive hard currency, the Payout Determination module 290 may initiate another system (not shown) to produce coins for the player. The Results Calculation module 250 and the Payout Determination module 290 work together to tabulate the results of a game or set of games and pay out any winnings due to a player.

The next software module in FIG. 2 is a Risk Management module 260. This module could monitor player activity in order to prevent collusion or other prohibited or illegal behavior. For example, the Risk Management module 260 may use account information in order to determine if some players are violating rules of the system. In one embodiment, the Risk Management module 260 could monitor playing behaviors of users to detect possible collusion. In another embodiment, the Risk Management module 260 could determine which gaming options are available to the player. For example, in Solitaire tournaments where all players are given the same starting board, the module could monitor to see if a certain group of players are consistently playing in the same Solitaire tournaments. Similarly, in car racing games for more than two players, the module could monitor to ensure that a certain group of players aren't consistently competing in the same races in order to work together and reach an unfair advantage. In another embodiment, the Risk Management module 260 may eliminate a player if the module detects prohibited behavior. For example, after a game, the risk management module may eliminate a player before giving the player any winnings. In another example, the module may eliminate the player during the game. None of these options are exclusive, a Risk Management module 260 consistent with the present invention could include all or none of these example functions and could include other functions as well. Many variations and modifications of the functions of this module depending on the type of game and types of bets would be known to those skilled in the art based on the present invention.

The last module shown in FIG. 2 is the Accounting module 295. All bets, funds transfers and other accounting functions could be handled through the Accounting module 295. The module could take care of debiting and crediting a player's account. In an embodiment of the present invention, even receipt of funds from the player to start a game could be monitored by the Accounting module 295. In yet another embodiment, the Payout Determination module 290 may direct the Accounting module 295 to credit the player's account.

The examples provided herein are exemplary only. The explanation of these modules and their uses are merely indicative. A person skilled in the art will recognize additional variations and embodiments.

Figure 3:
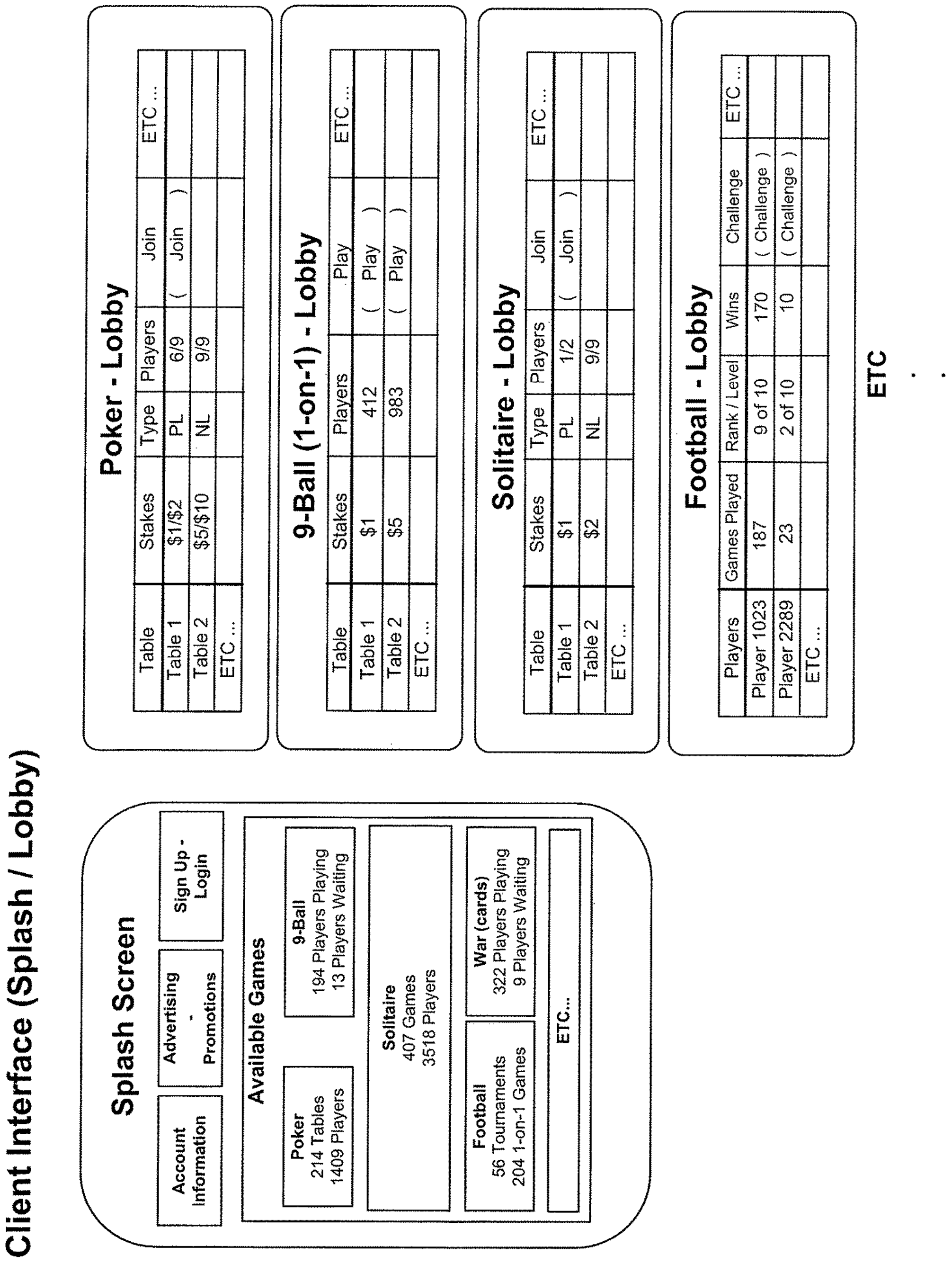
FIG. 3 illustrates exemplary depictions of user-interface screens consistent with the present invention.

Referring to FIG. 3, embodiments of the present invention are shown. For example, in one embodiment a player could select both the game and stakes at the same time. If a player wants to play 9-Ball, he or she could select that game and the stakes he or she wanted to play at ($1 or $5). The screens shown in FIG. 3 could be separate screens or a player could be provided with numerous different games all within a specific betting range. Additional variations and embodiments would be realized by one of skill in the art.

Figure 4:
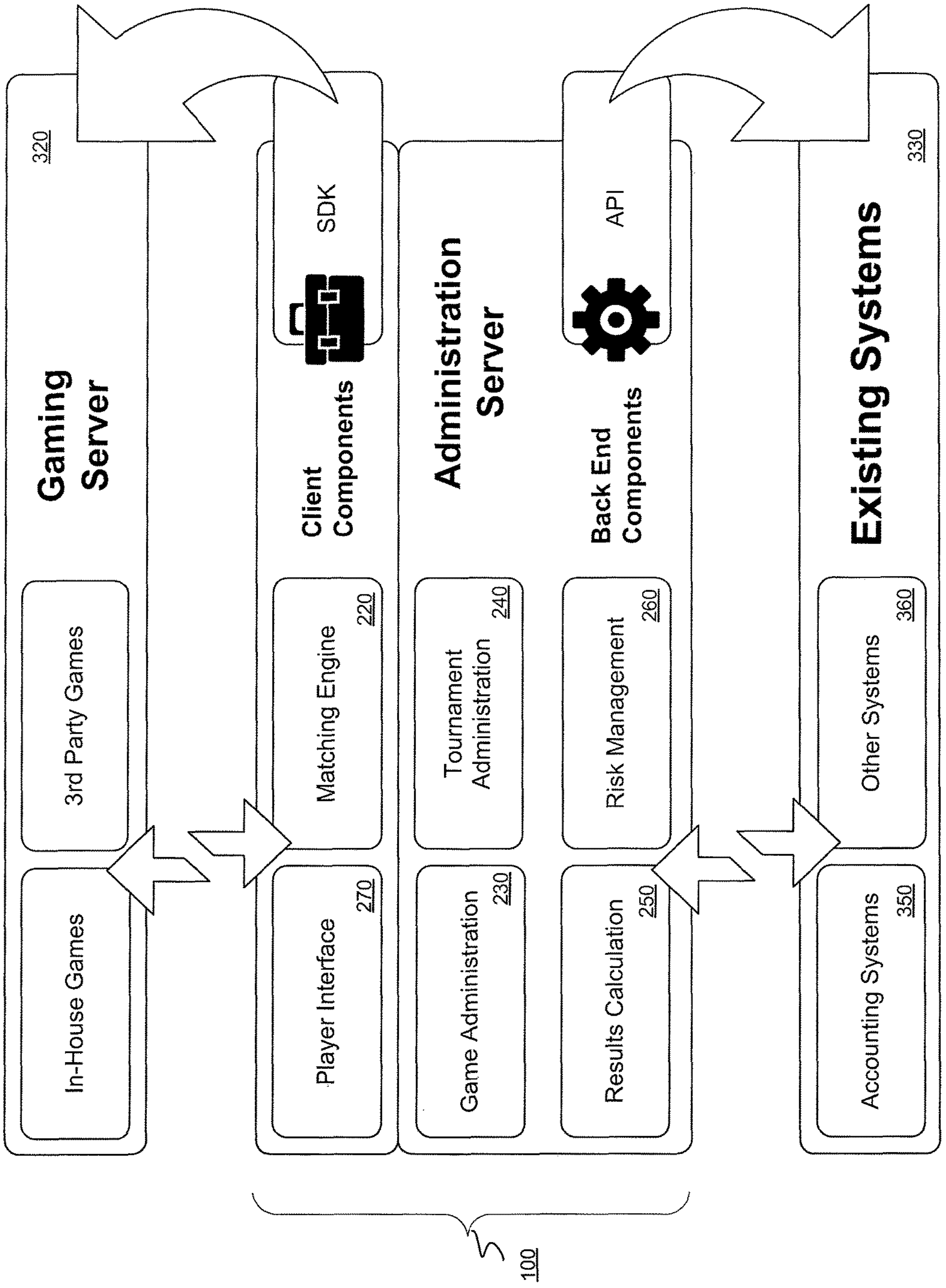
FIG. 4 illustrates another exemplary representation of software modules that could be used by and with a peer-to-peer platform consistent with the present invention.

Referring to FIG. 4, it shows yet another embodiment of the present invention. Again, this is a functional combination and not intended to be an actual network design. The figure shows a different combination of the functional modules described in FIGS. 1 and 2. Again, this embodiment is not intended to be limiting, but rather is intended to further explain an embodiment of the invention.

Note that the embodiments displayed in FIGS. 1, 2 and 4 are different embodiments of the present invention. Those having skill in the art will understand possible variations of the invention beyond these embodiments.

Overview of System

Figure 5:
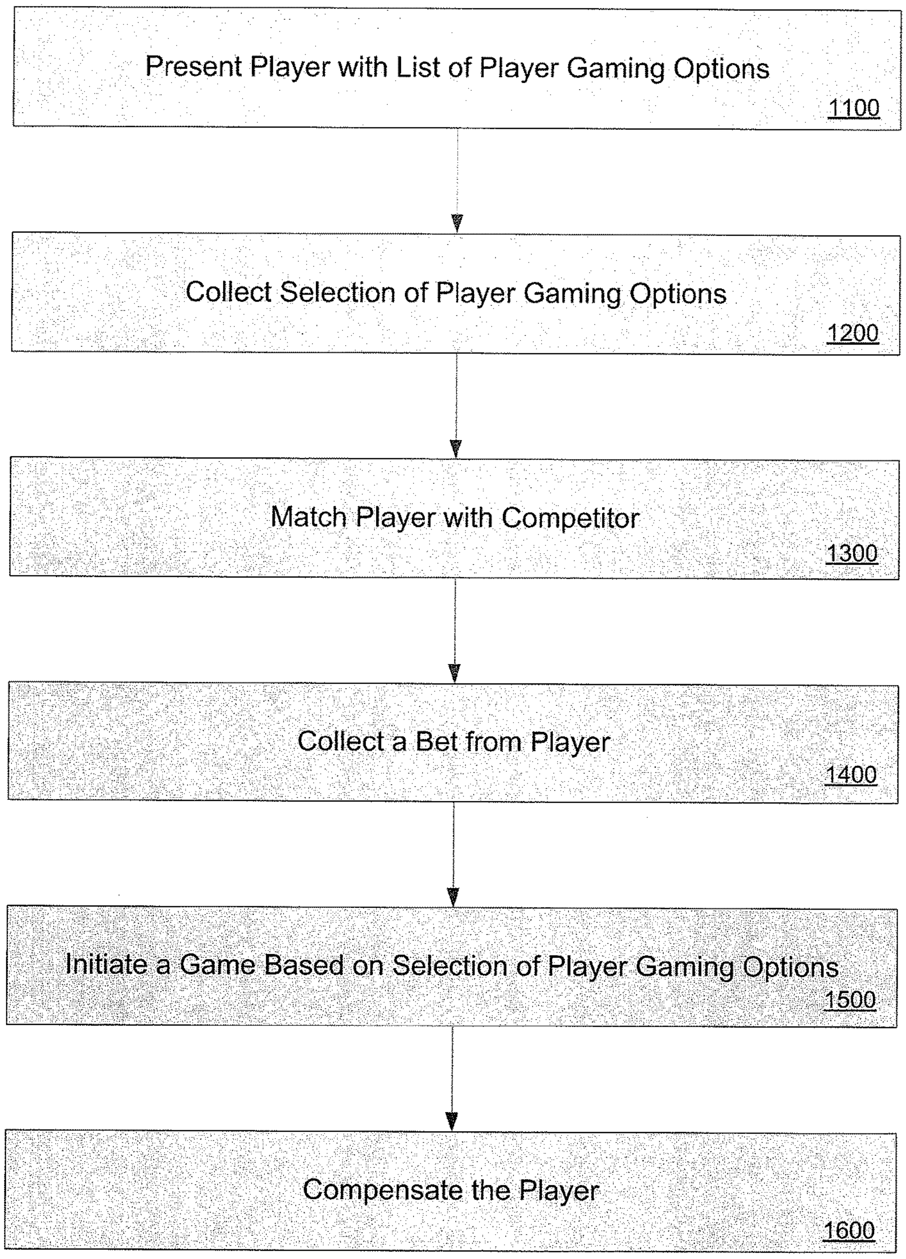
FIG. 5 illustrates one method by which a system could implement peer-to-peer gaming consistent with the present invention.

In FIG. 5, a flow chart represents broadly one method by which the present invention can conduct a game for a player. First, the system presents a player with a list of player gaming options 1100. Once the player has made a selection from the list of player gaming options, the system collects that selection 1200. The system then matches the player with a competitor 1300 and collects a bet from the player 1400. Next, the system initiates a game based on the selection of player gaming options 1500. Finally, after the game has completed, the system compensates the player 1600. It is not necessary that the steps run in this specific order. The steps may run out of order or be run in a loop. Additionally, the set of steps may run in a loop inside the larger method. Finally, this listing of steps is not exhaustive. Another embodiment consistent with the present invention may have a more steps or less steps. Those having skill in the art will understand possible variations of the invention beyond these embodiments.

Gaming Options

Gaming options are the parameters for a game. The system uses the gaming options to initiate the game for the player. For example, gaming options may include: a game type, such as Poker, 9-Ball, chess, or a football arcade game; a bet amount for a particular game type, such as $5 or 10 points; a specific competitor to play against, where the competitor may be identified in many ways, including but not limited to: console location, account name, nick name, or record; or even a preset game, complete with bet and game type, such as a game of chess with a $5 jackpot. This is not meant to be an exhaustive list. A person having skill in the art will understand what other gaming options are consistent with the present invention.

In one embodiment, a set of gaming options presented to a player could be referred to as Player Gaming Options, whereas a set of gaming options presented a competitor could be referred to as Competitor Gaming Options. These references are not limiting. Those skilled in the art will understand how to refer to different sets of gaming options.

Figure 11:
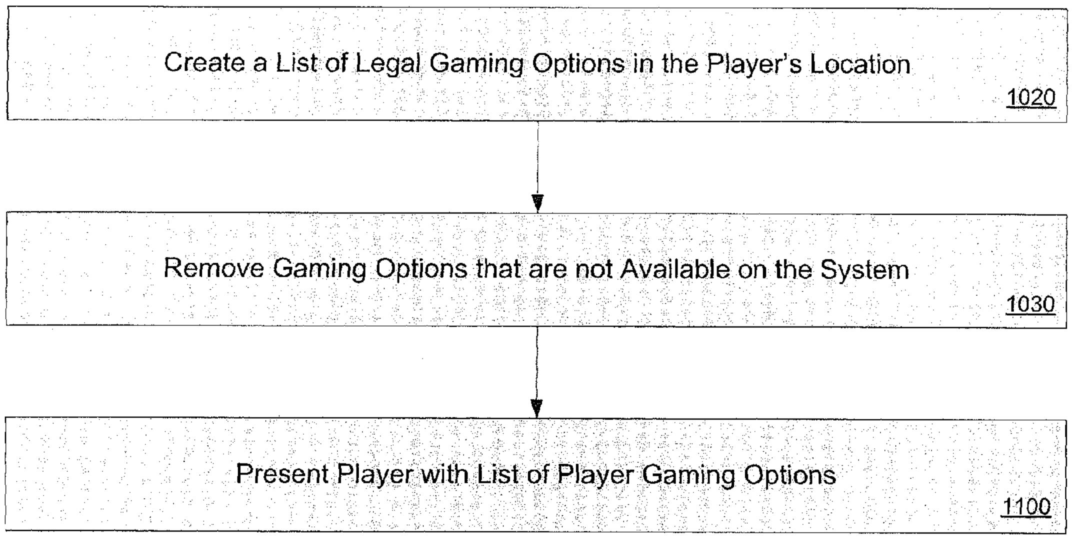
FIG. 11 illustrates one method by which a system could create a list of available gaming options for a player in a system of peer-to-peer gaming consistent with the present invention.

Before presenting a player with gaming options, the system determines which gaming options are available to the player. Referring to FIG. 11, the system could first create a list of legal gaming options in the player's location 1020. The list of legal gaming options might include limits on wagers or types of games allowed, such as a $100 per hand limit on poker or a prohibition on any game except slots. The system then could remove any gaming options that are not available on the system 1030. Some operators of the system may wish to establish a minimum or maximum betting amount or may or may not have a license for certain games such as a Football game. If the system is not authorized to offer a type of game, then the player will not be able to select that type of game as a gaming option. Once the system has determined the list of available gaming options, it presents the player with the list of player gaming options 1100.

Figure 12:
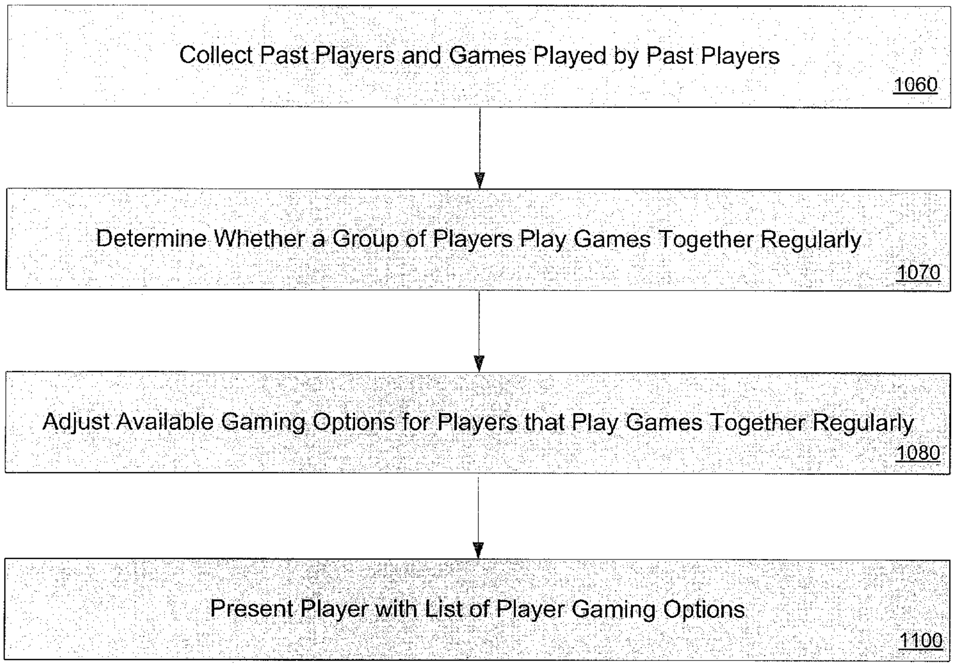
FIG. 12 illustrates one method by which a system could modify the list of available gaming options for a player to reduce risk in a system of peer-to-peer gaming consistent with the present invention.

While determining gaming options, the system may manage risk by modifying the available gaming options based on the possibility for a player acting illegally or in a prohibited way. The system may determine that a number of players are sitting near each other and will limit the ability to play a collaborative game among those players. Further, the system may keep records of past players based on data entered by a player, such as account information or other identifying features, such as a frequent player card, a scanned driver's license, or a scanned credit card. This list of entered data is not exhaustive. Those skilled in the art will understand how to receive identifying information about a player. For example, referring to FIG. 12, the system could first collect past players and games played by past players 1060. It then could determine whether a group of players play games together regularly 1070. If a group does play together regularly, the system can adjust the available gaming options 1080. Finally, the system will present the player with a modified list of player gaming options 1100.

Gaming Option Selection

After a player is presented with a list of gaming options, the player selects from the list of gaming options to start a game. The steps by which a player selects from the list of gaming options can be varied. The options herein described are merely exemplary; there are other orders in which a player can be presented with, and select from, a list of gaming options.

In an embodiment, a player could first select the player's preferred game type and then be presented with a list of competitors who are also interested in playing that game type. In another embodiment, a player could select a general category, such as a Sports Type Video Game category, and be presented with a list of competitors who are interested in that category of game types. After selecting the game type or game category, a player may be provided the opportunity to challenge another individual player in a heads up one-on-one (peer-to-peer) match where the competitive environment is a skill-based game. The game could be anything from Solitaire to Chess to Football.

In yet another embodiment, a player could select to play a series of games. For example, if a player considered himself or herself well-rounded in many different games, that player could challenge a competitor to a best two out of three where each game is a different skill-based game. A player could also play a best two out of three using the same skill-based game. In yet another embodiment, instead of a series type competition (best two out of three, best three out of five, etc.) the competition could be based on a total number of points between a multiple game competition. For example, if players are playing Pong, each player could agree that the player with the highest point total after two events (rather than just one) is the winner. Many alternatives consistent with the present invention will be realized by those skilled in the art. Variations on how to group players (such as by skill level or experience or participation in an ongoing tournament) could also be used.

In yet another embodiment, the system could provide a player with the ability to play the computer in a game of the player's choice (for a fee, or for free) while the player waits for competitors willing to compete.

In addition to the game and competitor, gaming option selection could include betting ranges. Betting ranges could be pre-selected options by the system, in which case, a player will select a betting range. In the alternative, a player could be allowed to select his or her acceptable betting ranges. The betting ranges may also be determined by external factors, such as house stakes and local laws.

It is not necessary for a player to pick every possible gaming option for each game. In certain embodiments, a player may only pick one gaming option.

Matching

In order to participate in a peer-to-peer competitive game, a player needs a game to play and a competitor. Referring again to FIG. 5, the system could select a betting range before presenting the player with a list of player gaming options 1100, or the player could select a betting range when the system collects the selection of player gaming options 1200. For example, a player could first select a betting range and then be presented with a list of competitors in that betting range. In another example, a player could select a game to play, then a betting range, and then be presented with a list of competitors willing to play the same game for similar amounts. Those skilled in the art will realize many variations to the order of the steps consistent with the present invention.

Figure 8:
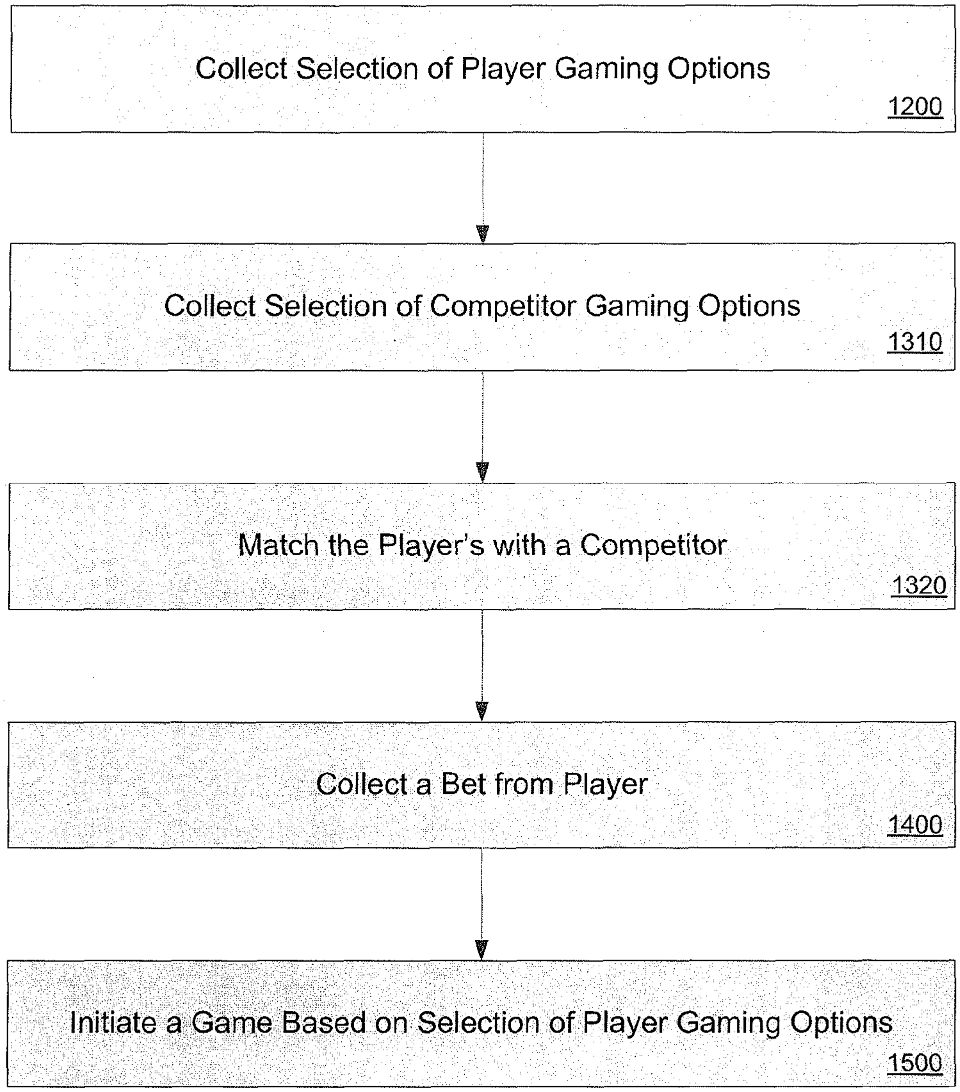
FIG. 8 illustrates one method by which a system could implement peer-to-peer gaming consistent with the present invention.

In one embodiment, referring to FIG. 8, after collecting the selection of player gaming options 1200, the system could collect at least one selection of competitor gaming options 1310. The system would then match the player and competitor based on their respective gaming options 1320 before collecting a bet from the player 1400 and initiating a game based on the selected gaming options 1500. The system would match the player and the competitor if their selections were compatible. In one embodiment, a player's and at least one competitor's selections would be compatible if their selections were identical. In another embodiment, a player and at least one competitor would be compatible if their selection of gaming options were closely related. In yet another embodiment, the system would create a list of compatible competitors. The list of compatible competitors would include all of the at least one competitors that are compatible with the player. Those skilled in the art will understand the many variations of matching players with competitors consistent with the present invention.

In an embodiment where players are allowed to select their own acceptable betting ranges, the system would automatically determine what players have betting ranges that overlap so that players are given a list of player gaming options that include options to play competitors who are willing to play for an acceptable amount.

In another embodiment, a player could select a betting range before selecting a game and/or competitor. For example, a player who is willing to risk less could select a lower betting range such as $5-$50 so they know he or she will find competitors willing to play for lower amounts. Conversely, a player who is only interested in playing for larger amounts could select a higher betting range such as $200-500. The betting ranges presented here are exemplary only. One skilled in the art will realize that betting ranges could vary and a betting range could be single value rather than a range of values (e.g., players willing to bet $10, players willing to bet $20, etc.).

Negotiation

The present invention can also allow a player and competitor to negotiate with each other, through the system, to determine how much to bet before playing. The bet could be of any value including a points style bet or a financial bet (e.g., money bet). In the preferred embodiment, a player and competitor will negotiate the bet before playing the game.

Figure 9:
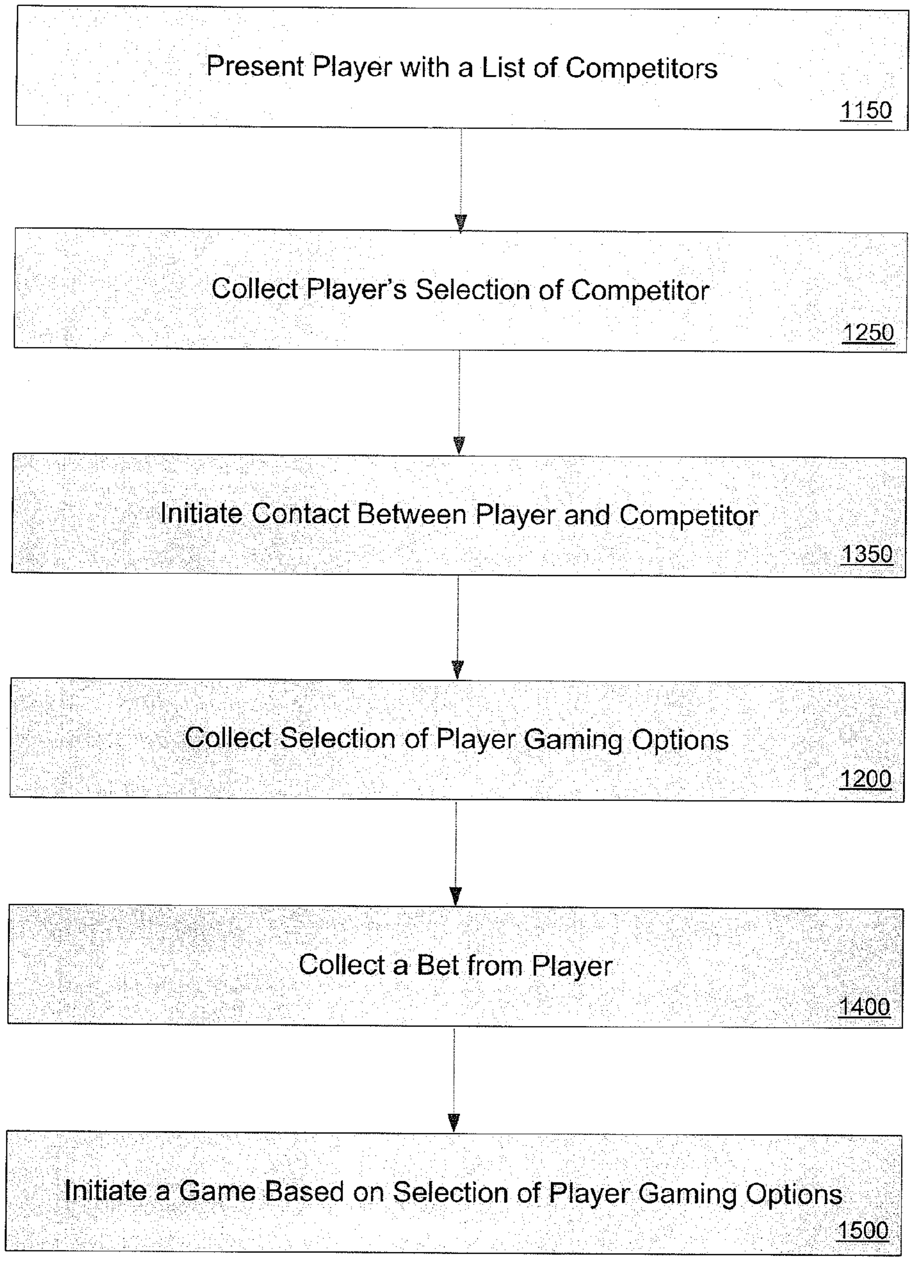
FIG. 9 illustrates one method by which a system could match compatible players and competitors in a system of peer-to-peer gaming consistent with the present invention.

In one embodiment, represented in FIG. 9, a player is presented with a list of competitors 1150. After the system collects the player's selection of a competitor 1250, the system initiates contact between the player and the selected competitor 1350. Once contact is initiated, the player and competitor can negotiate selected gaming options (not shown). This negotiation may fail and the player can restart the process. If the player and competitor come to an agreement, the system collects the selected player gaming options 1200. Finally, the system collects a bet from the player 1400 and initiates a game based on the selection of player gaming options 1500. For example, in such an embodiment, the system could present a new player with competitors waiting for a game. This presentation may include chatting capability such that individuals can stir up competition. In addition, it may provide a list of competitors such that a returning player can locate familiar names and challenge those individuals. Similarly, as shown in FIG. 3, the system could provide a list of competitors with varying ranks and experience and allow a player to challenge a given competitor. In addition, two players who have been competing in one type of skill-based game (such as a sports type video game) could decide to keep competing against each other but in a different skill-based game (such as a more intellectual type game such as Chess or a different sports type video game).

In another embodiment, a player could negotiate the wager they wish to compete for. In some embodiments, a player would negotiate the money they wish to compete for. In other embodiments, a player could negotiate for points or some other non-monetary value. In this embodiment, the interface will allow a player and competitors to communicate back and forth until they come to an acceptable bet. A player could be limited to betting within the original range they selected, or could be given the ability to negotiate for any amount.

In yet another embodiment, a player could negotiate the amount of points they wish to compete for. This could be used in, among other things, a tournament style of play where all players are originally assigned an equal number of points and the last player standing, or the player with the most points after a certain amount of time, wins. Many points styled tournaments or competitions could be imagined by those skilled in the art consistent with the present invention.

Funds Receipt

Once the bet has been determined, the agreed upon bet can either be deducted from the players account (this includes either points from a points account or money from a cash account), or money can be deposited into a "Cash In" device as the form of payment for the game. In addition, in some embodiments, the "Cash In" device could accept tickets from "Ticket Out" devices that could have been turned into cash. In another embodiment, the device could accept tokens. The ability to use the "Cash In" device allows for individuals to play the system without having to register or set up an account. Alternatively, by registering or setting up an account, players would have greater flexibility in using the system. Incentives, such as frequent player bonuses, could be established to help promote registration and player loyalty. In addition, registration may be required for certain types of tournaments or games, such as to prevent collusion or in order to track payouts for tax purposes or other legal issues.

Referring again to FIG. 5, in one embodiment, the system collects a bet from a player 1400 before initiating a game 1500. This is not meant to be limiting. The system may collect funds at a different point in the process. The system may also work off of an account, as discussed above. Those skilled in the art will realize many variations to the order of the steps and methods consistent with the present invention.

Game Play

Figure 7:
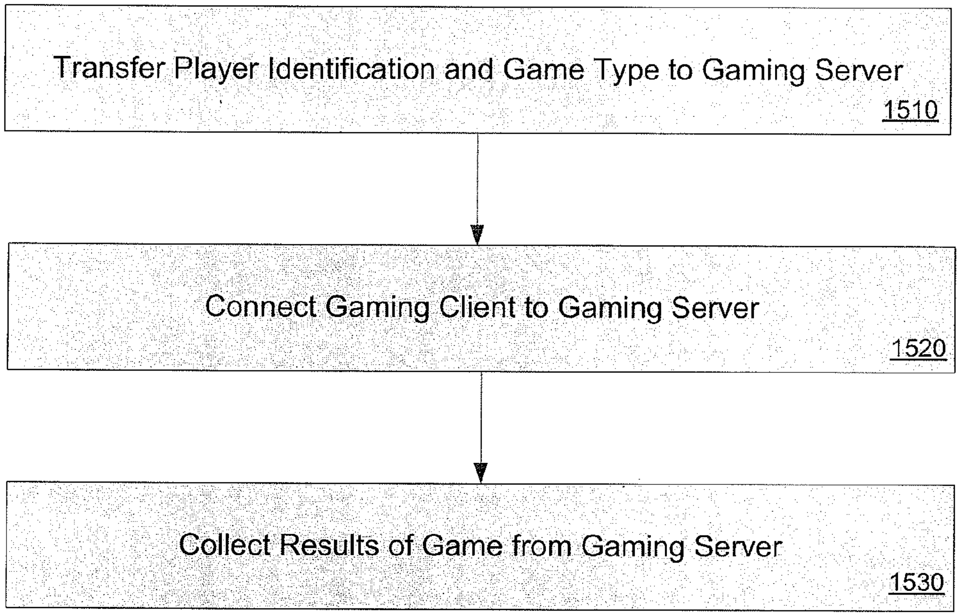
FIG. 7 illustrates one method of initiating a game for a player.

The methods in which a game can be rendered to a player via a user interface device can be accomplished in many different ways. Referring to FIG. 7, the system transfers player identification and at least the game type to the gaming server 1510. Then the system connects the player gaming client and gaming server 1520 so that the player can play the game (not shown). As the game is running or once the game is complete, the system collects results from the gaming server 1530. This information will be used to determine results and any possible winnings. Player identification could be the player's account, identification of the console that the player is operating, or other identifying information. This list of possible player identifications is not exhaustive. Those skilled in the art will understand variations of player identification consistent with the present invention.

In another embodiment not shown, the system also transfers competitor identification to the gaming server. The system then connects the competitor gaming client to the gaming server. The types of competitor identification would be the same as player identification.

In another embodiment not shown, the system includes a module to run the game. The gaming client is initially connected to the system during option selection and the system initiates the game by running the game itself. In this way, there is no communication with an external gaming server.

Completion and Payout

Figure 6:
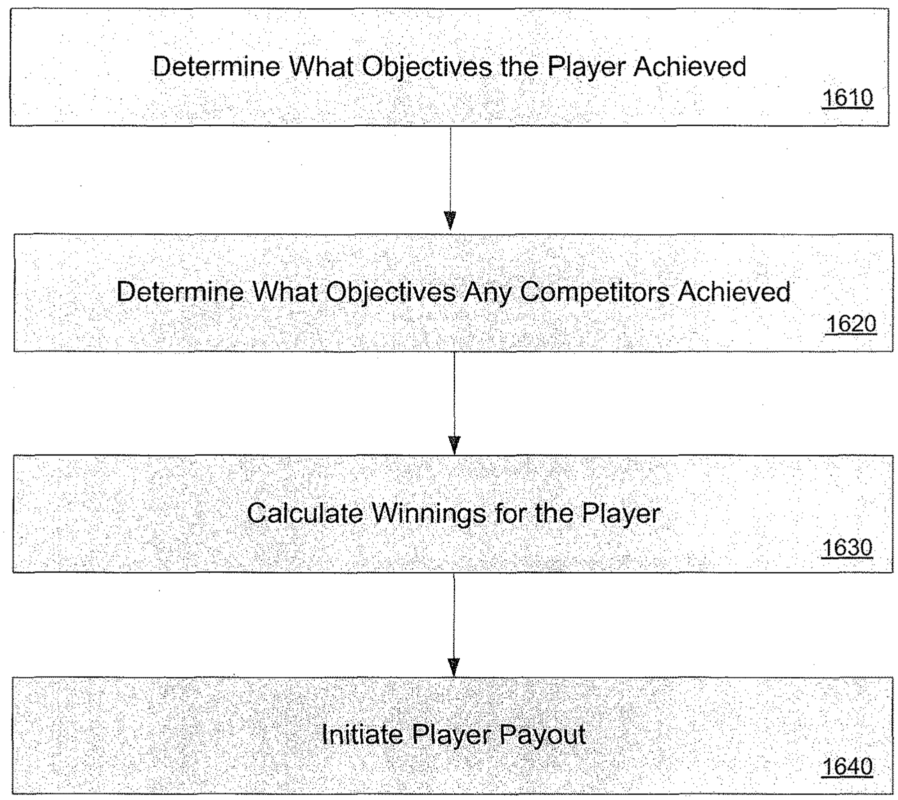
FIG. 6 illustrates one method of determining and paying a player's winnings after a game has been played.

Now referring to FIG. 6, to compensate the player, the system first determines which objectives the player achieved in the game 1610. Then it determines which objectives any competitors achieved in the game 1620. The system then calculates any winnings for the player 1630 based on objectives achieved and other information, including but not limited to: the rules of the game, and any selected gaming options. Once the amount of winnings is calculated, the system initiates payment 1640. In order to effect payment, the system may compensate a player with tokens, a "Ticket- Out," real money, or crediting the player's account. This example is but one embodiment of the present invention. Those skilled in the art will understand the modifications and variations possible to completing and compensating a player.

In the preferred embodiment of the present invention, the player is compensated a amount of the player's winnings less an administrative fee. This fee may be masked so that the player does not ever see the total player winnings so that the player does not know that the winnings are reduced by the administrative fee. This fee could be given to the operator of the game, the business where the game is located, the licensee of the game, the licensor of the system, or another person. This list is not meant to be exhaustive. Those skilled in the art will understand other persons to whom an administrative fee will be paid.

Multi-Player Skill-Based Tournaments

The present invention also includes systems and methods to conduct Skill-based Tournaments. Referring to FIG. 1, the Tournament Administration module 240 oversees these tournaments. While those skilled in the art will realize many variations and modifications consistent with the present invention, for purposes of description exemplary Skill-based Tournaments are described herein.

A tournament style of play provides players the opportunity to play the games without having to challenge other players to a match and negotiate a fee. Tournament style of play additionally allows for an added dynamic of a "Many vs. Many" environment, which provides many additional options for payouts and Tournament types.

In one exemplary embodiment, players could select tournament play and be presented with a list of available tournaments, such as the following:

| ID | GAME | PLAYERS | BET |
|---|---|---|---|
| 2032 | Pool | 6 out of 9 | $ 0.50 |
| 2390 | Pool | 9 out of 9 | $ 5.00 |
| 2798 | Pool | 1 out of 9 | $ 1.00 |
| 2109 | Car Racing | 8 out of 9 | $ 10.00 |
| 2249 | Car Racing | 2 out of 9 | $100.00 |
| . . . | | | |

From here, a tournament player, such as Player 1, can join any "Table" that is not full of players. For example, Player 1 could pick either "Table" ID 2109 or 2249 in order to play the Car Racing game. In this embodiment, the Car Racing game could be a video type game that looks like a standard car racing video game. In this example, ID 2109 has nine (9) "seats" at an entry fee of $10 per player with eight (8) players already seated and ready to play. Alternatively, if Player 1 wants to play for a higher fee he or she could select ID 2249 at $100 a player.

If Player 1 selects ID 2109, Player 1 will be "seated" for the competition and Player 1's account will be deducted by $10.00. Alternatively, Player 1 could be asked to deposit $10 using the "Cash In" device. Various rules could be used to determine when the precondition for the start of the tournament has been met. In some embodiments, the tournament could begin once nine players are seated. In other embodiments, the tournament could begin at a predetermined time as long at least two (2), or perhaps more, players are seated. Various rules and variations consistent with the present invention could be used. While the collection of funds from a player could be performed at various points in the process, in the preferred embodiment, a player can only hold a seat in the tournament with a complete entry fee.

Once funds have been collected from all players and the precondition for beginning the tournament has been met, the players will be allowed to compete in the "Game" of multiplayer Car Racing. For this embodiment, all nine (9) players in the tournament could be actively competing against each other in an interactive Skill-based gaming environment. Upon completion of the Car Racing game, the winning player or players would receive their winnings. The winnings could be determined by various methods. For example, after the house takes a cut of the pot, a set percentage could be paid to the first place winner, second place player, etc. This could be as simple as the house taking 5%, the second place player receiving back his or her stake, and the first place winner receiving the remainder. Those skilled in the art will realize numerous modifications consistent with the present invention.

After the game finishes, all players could be given the opportunity to start a new multiplayer Car Racing game or to select a different game or the same game but under different conditions. In one embodiment, a rematch process could go on continuously as long as there are a minimum of two (2) players at a "Table" and both players have enough money in their account or with them such that they can enter it into the "Cash In" device.

Numerous tournament types could be implemented on the system in the present invention. Exemplary tournaments are described herein.

Delayed Tournaments

In one exemplary embodiment, players are offered an opportunity to play in tournaments where players play a skill-based game, but not in a heads up one-on-one fashion, but as a single player trying to get the best score possible.

Delayed tournaments are tournaments in which all participants need to play the game within a validity period. In one embodiment, the tournament could be limited to a fixed number of players. In another embodiment, the tournament could have no limit on the number of players but could require a certain minimum number of players to have played during a defined time period.

Figure 10:
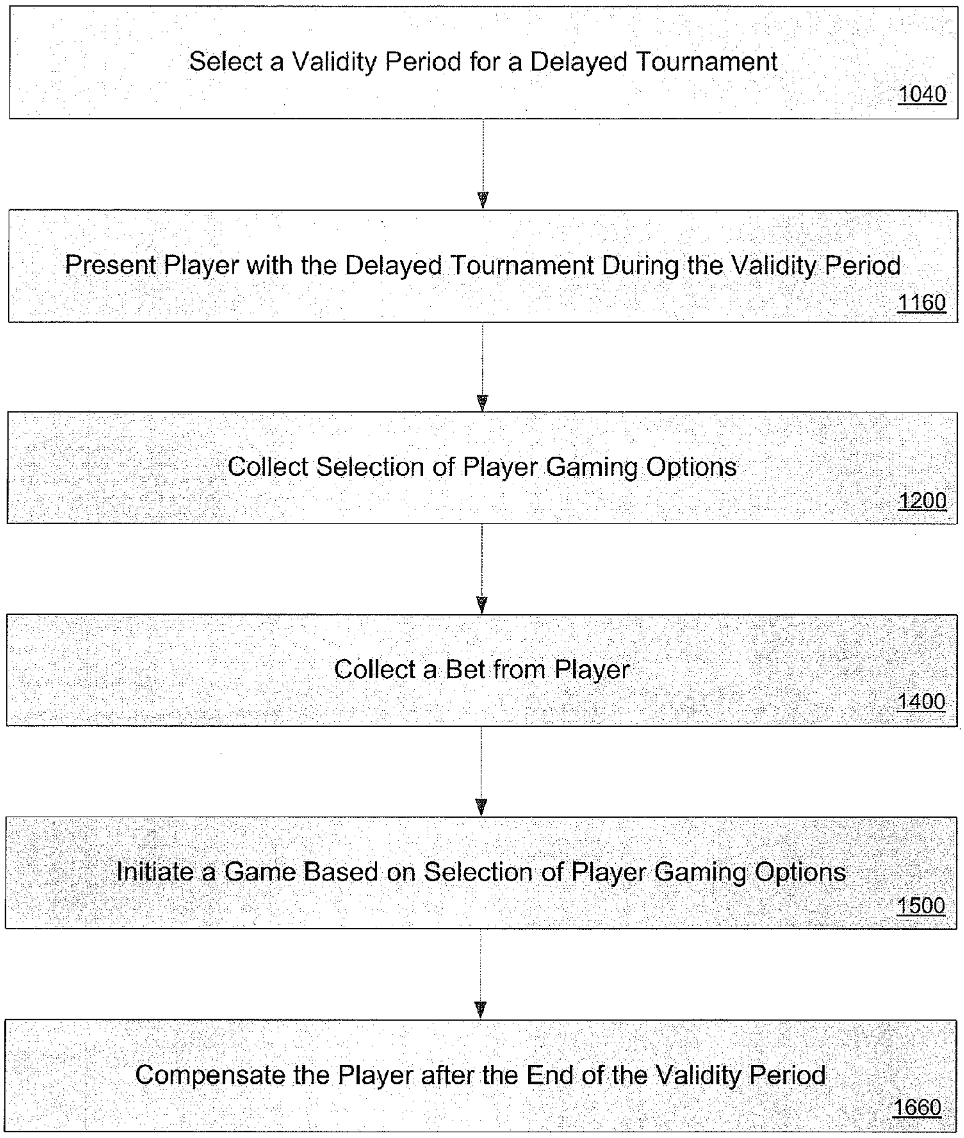
FIG. 10 illustrates one method by which a system could implement a delayed tournament consistent with the present invention.

Referring now to FIG. 10, this figure demonstrates an exemplary method for a delayed tournament. First, a validity period for the delayed tournament is selected 1040. For example, in one embodiment a Delayed Tournament requires that five (5) players play a game within a 24 hour period from noon of one day to noon of the following day. The tournament requires an entry fee and the game is Pool. Adam, Brian, Chris and David are the first four (4) players to enter the tournament, pay the entry fee and post a score. Each of the four (4) players plays the game in "single player" mode. Each player is presented with the exact same Pool game. The Tournament starts at 1 pm and Adam finishes his game at 1:10 pm, Brian finishes his game at 2:30 pm, Chris at 3:43 pm and David at 2:00 am the next day.

The delayed tournament is not finished yet because this tournament needs five (5) total players. The system presents a player with a set of valid gaming options 1160. So at 9:30 am, the system presents Eric with a Delayed Tournament that needs one more player. Then, the system collects Eric's selection of the tournament 1200, and the system collects his $2 entry fee 1400. The system then initiates a game for Eric 1500. When he finishes the game, the tournament is complete and the winners account is paid right away 1660.

In one embodiment, if no fifth (5th) player joined the game before the 24 hour time limit had elapsed, then all of the players would be refunded their money. In another embodiment, if no fifth (5th) player joined the game, the tournament would simply close and pay out according to the first four (4) players.

This delayed method of tournament game play allows the ability to provide skill-based game play without the need of readily available players to compete against at a specific time. Additionally this tournament type allows for a defined and concise structure that allow for a varying selection of game options, end times, participants and a layer of strategy when picking tournaments to play.

Players can sit down at a machine, play their game, post a score and check their account later to see if they won or lost that tournament, all on their own schedule. In addition, in one embodiment, rather than using an account, players could still use the "Cash In" and "Ticket Out" device. For example, if a player does not set up an account they could receive a ticket that identifies the player as a specific participant in the tournament. That ticket can then be used to check the tournament status, and once the tournament is complete the ticket can have a monetary value depending on the outcome.

Jackpot Tournaments

This type of tournament is just a modification of a Delayed Tournament. In a Jackpot Tournament, there is no limit to how many players can play in the tournament, each player adds to the Jackpot, and when the tournament ends, the player with the best score is appointed the winner. Additionally if there are enough players in a Jackpot tournament, other players could be awarded winnings.

In one embodiment, a player can enter Jackpot Tournaments as many times as he or she wants, paying the entry fee each time. In some embodiments, these type of tournaments many only allow a best score to qualify for winnings. In other embodiments, players would be permitted to collect winnings for multiple scores. Those skilled in the art will appreciate and understand modifications and variations consistent with the present invention.

In conclusion, the present invention provides, among other things, a system and method for peer-to-peer gaming. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed herein.

What is claimed is:

1. A computer-server-based method for peer-to-peer gaming, comprising:
- creating a list of player gaming options for a player in a current location,
  - wherein the list of player gaming options is automatically created at an administration server based on the current location of the player,
  - wherein the list of player gaming options is limited to legal gaming options in the current location of the player; and
  - wherein the legal gaming options include limits on waging amounts or types of games to prevent the player from unlawful play in the current location of the player:
- presenting a player with the list of player gaming options, wherein the list of player gaming options is presented to the player at a player gaming client;
- collecting a selection of player gaming options from the player,
  - wherein the selection of player gaming options includes a betting range;
- determining a game type that the player selected, wherein the game type is based on the selection of player gaming options;
- matching the player with an at least one competitor,
  - wherein matching the player with the at least one competitor is based at least in part on the betting range, and
  - wherein matching the player with the at least one competitor is performed by the administration server;
- collecting a bet from the player,
  - wherein the bet is within the betting range identified in the selection of player gaming options;
- initiating a game for the player, wherein the game is based on the selection of player gaming options;
- collecting results of the game, wherein the results of the game are received at the administration server; and
- compensating the player with player winnings, wherein the player winnings are based on the results of the game.

2. The computer-server-based method of claim 1, further comprising:
- performing risk management based on player information, wherein risk management is performed by the administration server.

3. The computer-server-based method of claim 2, wherein performing risk management based on player information comprises:
- collecting player information, wherein the player information comprises player gaming behavior;
- evaluating player gaming behavior for prohibited activity; and
- eliminating the player based on the prohibited activity.

4. The computer-server-based method of claim 1, wherein creating the list of player gaming options comprises:
- creating a list of gaming options; and
- removing gaming options from the list of gaming options based on the location of the player.

5. The computer-server-based method of claim 1, wherein initiating the game comprises:
- transferring an identification of the player to a gaming server;
- transferring at least a game type to the gaming server; and
- connecting the player gaming client to the gaming server.

6. The computer-server-based method of claim 1, wherein matching the player with the at least one competitor comprises:
- collecting a selection of competitor gaming options, wherein the selection of competitor gaming options is made by the at least one competitor; and
- creating a list of compatible competitors, wherein the list of compatible competitors is based on the selection of player gaming options and the selection of competitor gaming options.

7. The computer-server-based method of claim 6, wherein matching the player with the at least one competitor further comprises:
- presenting the player with the list of compatible competitors, wherein the list of compatible competitors is presented to the player at the player gaming client; and
- collecting a competitor selection from the player, wherein the competitor selection is from the list of compatible competitors.

8. The computer-server-based method of claim 6, wherein the list of compatible competitors comprises at least one competitor whose competitor gaming options are identical to the selection of player gaming options.

9. The computer-server-based method of claim 1, wherein presenting the player with the list of player gaming options comprises:

presenting the player with a list of competitors;

collecting a competitor selection from the player, wherein the competitor selection is made from the list of competitors, and wherein the competitor selection includes the at least one competitor; and initiating contact between the player and the at least one competitor.

10. The computer-server-based method of claim 1, wherein compensating the player with the player winnings is compensating the player with no monetary winnings.

11. The computer-server-based method of claim 1, wherein compensating the player with the player winnings comprises:

determining the player winnings;

deducting an administrative fee from the player winnings; and distributing the player winnings, less the administrative fee, to the player.

12. A system for peer-to-peer gaming, the system comprising:

at least one processor;

at least one communication interface; and a memory containing a plurality of program instructions configured to cause the at least one processor to:

create a list of player gaming options for a player at a current location, wherein the list of player gaming options restricts limits on wagers or types of games allowed in the current location of the player;

transfer the list of player gaming options to a player gaming client through the communication interface;

receive a selection of player gaming options from the player gaming client through the communication interface, wherein the selection of player gaming options includes a betting range;

match a player using the player gaming client with a competitor using a competitor gaming client, wherein the player and the competitor are matched based at least in part on the betting range;

receive a bet within the betting range;

initiate a game based on the selection of player gaming options, wherein the game is executed on a gaming server;

receive data about the game from the gaming server through the communications interface, and compensate the player with player winnings, wherein the player winnings are based on data about the game.

13. A system for peer-to-peer gaming, the system comprising:

at least one gaming client, wherein the at least one gaming client is configured to:

present only legal gaming options that include limits on waging amounts or types of games to prevent the player from unlawful or prohibited play in a current location;

accept a selection of at least one gaming option from a player, wherein the selection of the at least one gaming option includes a betting range; and allow the player to play a game based on the selection of the at least one gaming option;

an administration server, wherein the administration server is configured to:

receive the selection of the at least one gaming option from the at least one gaming client;

match the player with at least one competitor based at least in part on the betting range; and initiate the game for the player based on the selection of the at least one gaming option; and at least one gaming server, wherein the at least one gaming server is configured to:

run the game; and transmit data about the game to the administration server.

14. The system of claim 13, wherein the game is a skill-based game.

15. The system of claim 13, wherein the at least one gaming client is selected from a group consisting of: an interactive television, a handheld computer, a personal digital assistant, a computer, a cellular telephone, or an interactive kiosk.

16. The system of claim 13, wherein the administration server and the at least one gaming server are the same device.

17. The system of claim 13, wherein the administration server comprises:

a gaming option collection module, the module configured to collect the selection of the at least one gaming option;

a matching engine module, the module configured to match the player with a competitor based on the selection of the at least one gaming option received by the gaming option collection module;

a game administration module, the module configured to initiate the game, and further configured to receive the data about the game from the gaming server; and a results calculation module, the module configured to calculate results of the game, wherein the results are based on the data about the game received from the gaming server through the game administration module.

18. The system of claim 17, wherein the administration server further comprises:

a gaming option creation module, the module configured to create a list of gaming options;

a tournament administration module, the module configured to oversee at least two tournament games, wherein the at least two tournament games were initiated by the game administration module;

a payment initiation module, the module configured to compensate the player based on the results of the game; and a risk management module, the module configured to reduce risk in the system by modifying the list of gaming options created by the gaming option creation module.

19. The system of claim 18, wherein the tournament administration module is configured to oversee a delayed tournament.

20. The system of claim 18, wherein the gaming option creation module is configured to include or exclude certain gaming options from the list of gaming options based on a licensing status of the certain gaming options.

* * * * *